United States Patent
Jachimowicz et al.

[15] 3,666,695
[45] May 30, 1972

[54] EPOXY RESIN ADHESIVE CONTAINING A POLYMERIC FATTY-AMIDO AMINE AND MONOMERIC FATTY-AMIDO AMINE MIXTURE AS THE CURING AGENT

[72] Inventors: George A. Jachimowicz, Edina; Mark A. Minatelli, Minneapolis; Harold M. Preston, New Brighton, all of Minn.

[73] Assignee: General Mills Chemicals, Inc.

[22] Filed: Oct. 6, 1970

[21] Appl. No.: 78,609

[52] U.S. Cl..........................260/18 PN, 156/72, 260/18 EP, 260/18 N, 260/29.2 EP, 260/830 P, 260/830 TW
[51] Int. Cl............................................C08g 30/14
[58] Field of Search..........260/18 PN, 18 N, 830 TW, 830 P, 260/29.2 EP

[56] References Cited

UNITED STATES PATENTS

| | | |
|---|---|---|
| 3,140,566 | 7/1964 | Wagner ................................260/18 |
| 2,811,495 | 10/1957 | Witcoff et al. ..........................260/18 |
| 3,377,303 | 4/1968 | Peerman et al. ........................260/18 |
| 3,085,075 | 4/1963 | Lockshin et al. .......................260/18 |
| 2,760,944 | 8/1956 | Greenlee ................................260/18 |
| 3,265,647 | 8/1966 | Schaeffer et al. .......................260/18 |
| 3,347,882 | 10/1967 | Zuppinger et al......................260/830 |

*Primary Examiner*—Donald E. Czaja
*Assistant Examiner*—Eugene C. Rzucidlo
*Attorney*—Anthony A. Juettner and Patrick J. Span

[57] ABSTRACT

An epoxy resin system useful in aqueous form and particularly useful in forming carpet-like articles, in which the epoxy resin system when cured serves to bond fibrous materials to a variety of substrates. The system is particularly useful in bonding various fibers, natural and synthetic, to vinyl based substrates, e.g., vinyl plastisols, to which adhesion in the past has been poor. The system comprises an epoxy component and a liquid amine curing agent component which is a mixture of a monomeric fatty acid amido-amine and a polymeric fat acid amido-amine.

10 Claims, No Drawings

EPOXY RESIN ADHESIVE CONTAINING A POLYMERIC FATTY-AMIDO AMINE AND MONOMERIC FATTY-AMIDO AMINE MIXTURE AS THE CURING AGENT

This invention relates to epoxy resin systems useful in aqueous form in forming carpet-like articles in which the epoxy resin system when cured serves to bond fibrous materials to a variety of substrates. In addition, the individual fibers may also be bonded to each other at the point of contact with the substrate. The system is particularly useful in bonding various fibers, natural or synthetic, to vinyl based substrates to which adhesion in the past has been poor. The system which is preferably employed in aqueous form comprises an epoxy component and a liquid amine curing component which is a mixture of a monomeric fatty acid amido-amine and a polymeric fat acid amido-amine.

Carpet-like articles possess softness from substantially vertical yarns, or pile, which may be woven, knitted, flocked and/or adhesively bonded to a backing substrate. This invention finds utility in adhesive bonding of the above yarns or pile to the backing substrate, which is of particular utility in flocked articles but may also be employed with woven or knitted products in which the fibers or yarns are physically extended in and/or through the backing substrate. In addition to bonding the fibers or yarns to the backing, the adhesive may also bond individual fibers or yarns to each other, particularly at the point of contact thereof with the backing substrate.

Various methods of forming carpet-like articles are known and this invention will find utility therein. In general, such methods include applying the adhesive to the desired substrate and subsequently applying the fibers thereto. The invention is particularly useful in flocking methods such as electrostatic flocking disclosed in Canadian Pat. No. 808,593 wherein flocking fibers are bonded to a substrate employing an adhesive. The invention is also useful in the method of carpet manufacturing of U. S. Pat. No. 3,359,147 and in carpet manufacturing technology in general, in which an adhesive is employed.

In many methods of forming carpet-like articles, adhesives are required which are soluble in organic solvents. However, such solvents are hazardous to handle and may have a deteriorating effect on either the fibers, yarns, or the baking substrates. In electrostatic flocking methods, many adhesives cannot be employed as they are non-conductive or require the addition of conductive materials such as powdered metal fillers in order to render the adhesive conductive. In many other cases, the particular adhesive is deficient in that it does not provide adhesion to many of the substrates or the fibers to be attached thereto, such as vinyl based substrates or synthetic fibers. The bonding to vinyl plastisol based substrates is particularly difficult.

An aqueous thermosetting epoxy resin system has now been discovered which avoids the disadvantages found previously. The aqueous system of this invention requires no organic solvents and thus avoids deterioration of the substrate and/or fibers or yarns and eliminates hazards associated with use of solvents. While epoxy resins are generally non-conductive materials and the curing agents herein relatively moderate conductors which in non-aqueous form would provide substantially a neutral or low conductivity, in the presence of water, the system has excellent conductivity prior to cure without the use of added fillers or materials to promote conductivity. Thus the system is particularly adapted for use in flocking methods. In addition, the system has general adhesive properties thus providing adhesion to all substrates in general but particularly to the difficult bonding substrates such as vinyl based or other plastic based substrates, such as nylon, polyester, etc.

The aqueous thermosetting system comprises an epoxy component and a liquid amido-amine curing agent. The epoxy component is a liquid epoxy resin. By liquid is meant liquid form at room temperature, i.e., about 25° C. The epoxy resin may be a single liquid resin or a blend of different epoxy resins which are, however, liquid at room temperature. It has been found that small amounts of solid epoxy resins tend to provide improved flexibility and it is, accordingly, preferred that small amounts of solid epoxy resin be blended with the liquid epoxy resin. This is easily accomplished by blending at elevated temperatures a small amount of solid epoxy resin into the liquid epoxy resin. With such blending, the final epoxy component will be in liquid form at room temperature as the solid epoxy resin will be dissolved or in solution in the liquid resin. In general, up to about 15 percent by weight of a solid epoxy resin can be so blended with a liquid epoxy resin so as to provide a product liquid at room temperature. Thus, the epoxy resin component may be from 85-100 percent liquid resin blended with 0-15 parts of a solid epoxy resin. Where such blend is employed, the preferred ratio is 90 parts by weight of the liquid epoxy resin to 10 parts by weight of the solid epoxy resin. Thus preferably the epoxy component comprises 90 percent by weight of the total epoxy resin component of a normally liquid epoxy resin and 10 percent by weight of a solid epoxy resin, the final blend being liquid at room temperature.

By "epoxy resins" as employed in this invention is meant the polyglycidyl polyethers of polyhydric phenols. These epoxy resins are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee U.S. Pat. Nos. 2,585,115 and 2,589,245. Several of these resins are readily available commercial products.

Typical polyhydric phenols useful in the preparation of epoxy resins include resorcinol, novolac resins, various bisphenols and other condensates resulting from the condensation of phenol with aldehydes and ketones such as formaldehyde, acetaldehyde, acetone, methyl ethyl ketone, and the like. A typical epoxy resin prepared from the bisphenols is the reaction product of epichlorohydrin and 2,2-bis(p-hydroxy phenyl) propane (bisphenol A), the resin having the following theoretical structural formula:

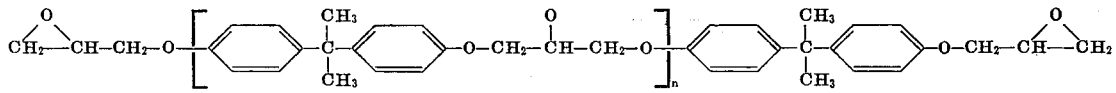

where $n$ is 0 or an integer up to 10. Generally speaking, n will be no greater than 2 or 3 and is preferably 1 or less.

A typical epoxy resin prepared from the novolac resins and epichlorohydrin has the following structural formula:

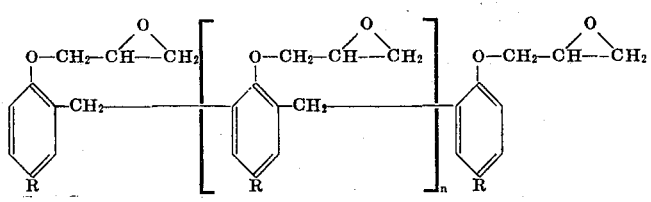

in which R is hydrogen or an alkyl group having from one to four carbon atoms and $n$ has a range of 1 to 8. The novolac resins are well known polyhydric phenols having the following structural formula:

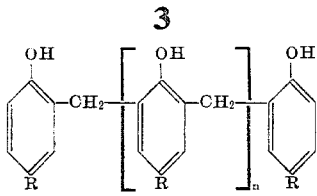

in which R and n are defined as above.

Epoxy resins may be characterized further by reference to their epoxy equivalent weight, the epoxy equivalent weight of pure epoxy resins being the mean molecular weight of the resin divided by the mean number of epoxy radicals per molecule or in any case the number of grams of epoxy resin equivalent to one mol of the epoxy group or one gram equivalent of epoxide. The liquid epoxy resins encompassed by this invention are those having an epoxy equivalent weight of about 160–300, preferably 175–240, the optimum about 190. The solid epoxy resins encompassed by this invention are those having an epoxy equivalent weight of about 400–1,000, preferably about 450–550, with the optimum about 525.

The liquid curing agent component is a fatty amido-amine comprised of a mixture of a monomeric fatty amido-amine and a polymeric fatty amido-amine. By "monomeric fatty amido-amine" as employed herein is meant the amido-amine of a monomeric fatty acid in which the monomeric fatty acid contains from 8–24 carbon atoms. By "polymeric fatty amido-amine" as employed herein is meant an amido-amine of a polymeric (polymerized) fatty acid. Since the monomeric fatty acids contain from 8–24 carbon atoms, the simplest polymer, the dimer, will accordingly contain from 16–48 carbon atoms.

The amido-amine resins prepared from a stoichiometric excess of amine may be further characterized by their amine number or value, amine number being the milligrams of KOH equivalent to the amine alkalinity present in one gram of sample. The monomeric fatty amido-amines herein are those having an amine number of about 400 to 500, preferably 425 to 450, the optimum being about 435. The polymeric fatty amido-amine resins encompassed herein are those having an amine number of about 50–700, preferably about 340.

Liquid monomeric fatty amido-amines, which are commercially available products, are prepared by reacting a monomeric fatty acid with a stoichiometric excess of polyamine in sufficient amount to provide the desired amine number of the product. The polyamines employed for reaction in forming the monomeric fatty amines are aliphatic polyamines, preferably the polyalkylene polyamines in which the alkylene group contains from 2–6 carbon atoms. Illustrative polyamines are diethylene triamine, dihexamethylene triamine, triethylene tetramine, tetraethylene pentamine, 1,3-imino-bispropyl amine and the like. These polyamines may be ideally represented by the formula $H_2N(R'NH)_nH$ where R' is an aliphatic hydrocarbon radical and n is an integer from 1 to 6. The products are prepared in a conventional amidification reaction well known to those skilled in the art which comprises heating the reactants at temperatures of about 100°–300° C., preferably about 200°–250°C., for a time sufficient to provide amidification of the carboxyl groups present together with removal of water of reaction. The time is not critical and is generally dependent on the temperature employed, shorter times being required at the higher temperatures. In general, time periods of one-half to 8 hours are employed with about 2–4 hours being customary at the preferred temperatures of reaction of about 200° C.

In preparing the liquid polymeric fatty amido-amines, the process of preparation is substantially the same as for the preparation of the monomeric fatty amido-amines. For the polymeric fatty amido-amines encompassed herein, at least a portion of the aliphatic polyamine employed (as defined above) is replaced by certain diamines, preferably unsubstituted, although the alkyl (1–8 carbon atoms) substituted may be employed. In the preparation of the polymeric fatty amido-amine, the two amines may be added at once at the beginning of the reaction or in two stages, one at the beginning with subsequent addition of the second amine at some later stage of the reaction. Such diamines may be represented by the formula HN—Z—NH where Z is selected from the group consisting of:

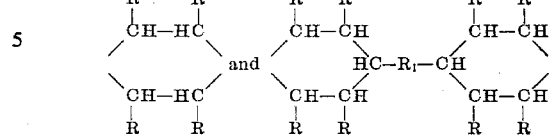

where R is hydrogen or an alkyl radical having from 1–6 carbon atoms and $R_1$ is a divalent aliphatic hydrocarbon radical containing at least one carbon atom, preferably an alkylene radical of 1–6 carbon atoms. The diamines should be employed in an amount to provide about 25–75 amine equivalent percent of the total amine reactant, and preferably about 30–55 percent with optimum properties obtained at about 45 percent. The aliphatic polyamine contributes the remainder of the amine groups present.

The polymeric fat acids are well known. A summary of the preparation of polymeric fat acids is found in U.S. Pat. No. 3,157,681. Commercially available polymeric fat acids so prepared from tall oil fatty acids generally have a composition as follows:

| | Percent by weight |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

Polymeric fat acids having higher dimeric fat acid contents are obtained by fractionation by suitable means such as high vacuum distillation or by solvent extraction techniques from polymeric fat acids having lower dimeric fat acid contents such as those noted above.

The relative ratios of monomer, dimer, and trimer in such unfractionated polymeric fat acids are dependent on the nature of the starting material and the conditions of polymerization. For the purposes of this invention, the term "monomeric fat acids " refers to the unpolymerized monomeric acids, the term "dimeric fat acids" refers to the dimeric fat acids, and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric, and trimeric fat acids. The term "fat acids" is intended to include saturated, ethylenically unsaturated and acetylenically unsaturated, naturally occurring and synthetic monocarboxylic aliphatic acids containing from eight to 24 carbon atoms.

The saturated fat acids are generally polymerized by somewhat different techniques than those described in U.S. Pat. No. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid, and lignoceric acid.

The ethylenically and acetylenically unsaturated fat acids which may be polymerized and their method of polymerization are described in the above-mentioned U.S. Pat. No. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5 (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, this analytical method was that employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be some what higher than that of the chromatography method. Because of the difference of the two methods, there will be some variation in the values of the contents of various fat acid fractions. Unfortunately, there is no known simple direct mathematical relationship correlating the value of one technique with the other.

As indicated, the curing agent component is a mixture of the monomeric fatty amido-amine and a polymeric fatty amido-amine. In such mixture, the polymeric fatty amido-amine will comprise about 40–60 percent by weight of the total curing agent, the remainder being the monomeric fatty amido-amine. The exact ratio will depend largely on the respective amine number of the products and the amount of amine necessary to cure the epoxy resin. With a polymeric fatty amido-amine of an amine number of about 340 and a monomeric fatty amido-amine number of about 430, the preferred ratio is a 50—50 mixture by weight, which provides a mixture having an amine number of about 400. With such mixture and an epoxy component comprising 90 parts by weight of a liquid bisphenol A epoxy resin containing 11 percent butyl glycidyl ether having an epoxy equivalent weight of about 180 and 10 parts by weight of a solid bisphenol A epoxy resin having an epoxy equivalent weight of about 525, the weight ratio of epoxy resin and curing agent to achieve optimum results will be about 60 epoxy to 40 of curing agent. With other amine number products and other epoxy resins, the optimum results will be achieved at weight ratios of 40–70 epoxy to 30–60 of curing agent or about 40–70 percent by weight of epoxy resin based on the total weight of epoxy and curing agent components.

As indicated, the epoxy component and curing agent component are employed in aqueous form. Accordingly, prior to use, the two components are mixed with water to provide an aqueous emulsion. In general, the ratio by weight water to weight of epoxy and curing agent is about 1 to 3:1, preferably about 1.5:1. Thus, employing 60 parts of epoxy and 40 parts of curing agent (a total of 100 parts) about 150 parts by weight of water is preferably employed.

Optionally, a thickener or gellant may further be employed in order to adjust the viscosity of the aqueous emulsion to that most suited for the particular method of application of the adhesive. This is particularly desirable in flocking methods to which the present invention finds special utility. In flocking methods, it is desirable that the flock material by held in the desired pattern and position during flocking and subsequent curing. This is particularly true in methods employing silk screen techniques where the adhesive is applied over a screen in a desired pattern with the excess removed. In order to retain the desired pattern in sharp definition, it is desirable that the adhesive composition be relatively thick and maintain a thixotropic or gelled state, such as a mayonnaise consistency. In this manner, the desired pattern is maintained and the flock retained thereon in the desired pattern during flocking and curing. If the viscosity or consistency is too low and tends to flow, the pattern will become less definite or sharp. In addition, the flock fibers may not be retained by the adhesive. It is desirable in such flocking methods that the viscosity be in the range of about 12,000–50,000 centipoises.

Any number of thickeners suitable for an aqueous system may be employed to adjust the viscosity. Illustrative of such thickeners are bentonite clays, methylcellulose, and polyacrylic acids or the salts thereof. The bentonite clays such as Aquagel (Wyoming montmorillonite clay) are a preferred gellant or thickener. The polyacrylates are another preferred thickener, one of such being Acrysol ASE60 which is a crosslinked acrylic copolymer and commercially available from Rohm and Haas as a 28 percent aqueous emulsion at acid pH. Still another is an ammonium polyacrylate resin of B. F. Goodrich known as Good-rite WS–851. The amount of thickener will vary dependent on the specific thickener employed and the particular viscosity desired. In general, such as with the Acrysol thickener, this amount will be on the order of about 1–3percent based on the total weight of epoxy, curing agent and water present.

The aqueous system has a working pot life of about 0.5–2 hours dependent on the thickener used. While the system will cure at room temperature in practice, after application of the flock, the assembly is heated at elevated temperatures to promote rapid curing. The particular temperature will depend largely on the type and materials of the assembly as such temperature should be lower than the degradation of the materials. In general, temperatures up to about 300° F. are employed and need not be exceeded.

After application of the adhesive to the desired substrate, the flock or carpet-like pile material is then applied. As earlier indicated, electrostatic flocking is one method of fiber deposition. The substrate to which the flock may be applied is any desirable substrate; however, the adhesive of this invention is particularly useful in bonding flock to vinyl based materials. Illustrative of such vinyl based substrates are plastisols, plasticized vinyl coated fabrics, and unsupported plasticized vinyl film. Other substrates would include wood, metals such as iron, steel, tin, aluminum, etc., paper, cloth or textiles, rubber, plaster, concrete, ceramics, and plastics such as polyester films (Mylar) and polyvinyl fluoride (Tedlar). Illustrative flock materials are those having the capacity of being bonded or anchored by an adhesive to a base substrate. Such flock or pile materials are any fibrous, natural or synthetic, such as cotton, jute, wool, polyester (Dacron), polyvinyl chloride, polyurethane, polyethylene, polystyrene, rayon, and polyamides such as nylon.

The invention can best be illustrated by means of the following examples:

EXAMPLE 1

PREPARATION OF POLYMERIC FATTY AMIDO-AMINE

Into a reactor are placed 2 equivalents of a commercially available polymeric fat acid (polymerized tall oil fatty acids) having the following typical analysis:

| | |
|---|---|
| Acid Value | 195 |
| Saponification Value | 200 |
| Iodine Value | 110 |
| % Monomer | 44 |
| % Intermediate | 3 |
| % Dimer | 43 |
| % Trimer | 10 |

There is added to the polymeric fat acids 3 equivalents of 1,3-di-4-piperidyl propane. The temperature is raised to 400° F. and held until the acid number of the product is less than 3 (about 8 hours). The resin is cooled to 250° F. and 4 equivalents of tetraethylene pentamine is added. The temperature is then raised to 400° F. and maintained at this temperature for 1 hours. The resin is then cooled and removed from the reactor. The resin product had the properties:

| | |
|---|---|
| Amine No. | 341 |
| Acid No. | 1.2 |

| | |
|---|---|
| Brookfield Viscosity, poises at room temperature | 122 |
| Gardner Color | 7+ |

EXAMPLE 2

PREPARATION OF CURING AGENT COMPONENT

There was blended 50 parts by weight of the polymeric fatty amido-amine of Example 1 and 50 parts by weight of a commercially available monomeric fatty amido-amine of monomeric fatty acids and tetraethylene pentamine, which had the following properties:

| | |
|---|---|
| Amine No. | 435 |
| Acid No. | 1–3 |
| Brookfield Viscosity, poises | 8 |
| Gardner Color | <11 |

The blend of the two resins which comprises the curing agent component, had the following properties:

| | |
|---|---|
| Amine No. | 400 |
| Acid No. | 2.3 |
| Brookfield Viscosity, poises | 22 |
| Gardner Color | 8 |

EXAMPLE 3

PREPARATION OF EPOXY COMPONENT

There was blended by heating from 30° to 120° C. over a 10 minute period and holding 1 hour with agitation before cooling to room temperature 90 parts by weight of a liquid epoxy resin, the polyglycidyl ether of 2,2-bis(p-hydroxyphenyl) propane containing 11 percent by weight of a reactive monoepoxide, butyl glycidyl ether, having an epoxy equivalent weight of about 180 and 10 parts by weight of a solid epoxy resin, polyglycidyl ether of 2,2-bis(p-hydroxyphenyl) propane, having an epoxy equivalent weight of about 525. This blend comprises the epoxy resin component.

EXAMPLE 4

In order to illustrate the properties of the cured system, 40 parts by weight of the curing agent component of Example 2 were mixed with 60 parts of the epoxy component of Example 3. The gel time of a 1 lb. batch was 42 minutes. The properties of the cured product (cure conditions consisting of overnight curing at room temperature, about 25° C., followed by a post cure of 2 hours at 300° F.) were as follows:

| | |
|---|---|
| Moisture absorption ASTM-D570-63T | 0.16 |
| Heat Distortion Temperature, °C. ASTM-D468 (264 psi) | 46 |
| Tensile Strength, psi. ASTM—D638—64T | 3540 |
| Elongation, %, ASTM-D638-64T | 23 |
| Flexural Modulus, psi. ASTM—D790—63T | 190500 |
| Flexural Ultimate, psi. ASTM—D790—63T | 14100 |
| Compressive Yield, psi. ASTM—D695—63T | 8770 |
| Barcol Hardness | 25 |
| Izod Impact, lb./in. | 22 |

EXAMPLE 5

This example will serve to illustrate the use of the adhesive in aqueous emulsion form and the use thereof in preparing a flocked carpet-like article.

In forming the carpet-like articles, the equipment employed was a continuous mixing equipment (Oakes Mixer available from the E. T. Oakes Corp., Islip, Long Island, New York) to produce the adhesive emulsion. The Oakes Mixer was adjusted to mix and feed the adhesive components in the appropriate proportions to a vacuum belt screen printer (Precision Equipment Co.) which has a continuous perforated rubber belt table and vacuum pump to hold the substrate to be printed firmly in place during printing; silk screens for permitting application of the desired decorative pattern of adhesive on the substrate and electrostatic flocking equipment to apply the flock material to the adhesive coated substrate. Auxiliary equipment were also employed such as an oven in which to provide curing at elevated temperatures and rotating brush equipment to remove by brushing any excess unbonded flock material.

The adhesive composition employed was the curing agent component of Example 2, and the epoxy component of Example 3. The adhesive was employed in aqueous emulsion form by mixing with water in the mixing equipment, the water containing a thickener, Acrysol ASE60. The mixing rates and ratios employed were as follows:

| | Lb./min. | % of total | % of solids |
|---|---|---|---|
| 1. Epoxy Component | 0.72 | 24 | 60 |
| 2. Curing Agen Component | 0.48 | 16 | 40 |
| 3. Water Portion | 1.8 | — | |
| (a) Water | | 58 | |
| (b) Thickener | | 2 | |

The adhesive composition was then continuously applied in a decorative pattern through printing screens to vinyl plastisol mats held in place on the endless belt printer. After application of the adhesive to the mat, the mats were electrostatically flocked with 30 dimer-100 mil long nylon flock. About 200, 20-in. by 30-in., flocked mats or carpets were produced. The mats or carpets were then cured in an oven at 275° F. for 30–45 minutes. Ten mats were allowed to remain overnight at room temperature prior to curing at 275° F. for 30–45 minutes. In all cases, an excellent adhesive bond developed between the adhesive and the vinyl substrate.

After curing, the mats were allowed to cool to room temperature and any excess unbonded flock was removed by inserting the mats between a pair of rotating brushes.

The freshly cured mats were then subject to nail lift and coin abrasion or scuffing tests. The nail lift test involves merely use of the fingernail to attempt to peel the adhesive from the substrate layer. The coin test involves scuffing of the flocked surface with the edge of a quarter to attempt to loosen flock from the substrate. The tests were conducted on both a dry and wet portion of the mat, the wetting being accomplished by soaking a portion of the mat in water for 16 hours at room temperature. It was not possible in either case to obtain fiber loss through the coin test. In the nail lift test, the vinyl plastisol substrate would delaminate and it was not possible to remove the flock from the vinyl without cohesive failure of the vinyl.

Samples of the mats were later subjected to Tabor abrasion tests to determine cycles to first sign of failure on both wet and dry using a Tabor Abraser with a No. H-18 abrasive wheel and a total load of 1,000 grams on each wheel. The wet samples were obtained by immersing the sample in tap water at about 25° C. for 30 minutes prior to test. Pull tests were also conducted on an Instron tester in which a 0.01 sq. in. area of flock held in a tweezer mechanism is subject to a loaded pull and the maximum pounds per sq. in. pull noted. The excellent test results on different colored vinyl plastisol substrates can be seen from the following data:

| Vinyl Substrate | Tabor Abrasion (Cycles) Dry | Wet | Pull psi. Dry | Wet |
|---|---|---|---|---|
| Black | 1650 | 2300 | 397 | 88 |
| Blue | 2800 | 1900 | 176 | 133 |
| Green | 1600 | 3500 | 233 | 156 |

The foregoing illustrates the adhesive composition and the use thereof in an electrostatic flocking application. Besides electrostatic flocking, mechanical flocking using a beater bar to orient the flock in a vertical position can be used. Other methods of application of the emulsion adhesive in addition to silk screen can be used. These are gravure printing, kiss roll, doctor knife or hand roller application. Similar results are also obtained using the liquid epoxy resin of Example 3, but without the use of the solid epoxy resin.

In another group of runs, a polymeric fatty amido-amine employing a 50:50 (equivalents basis) mixture of piperazine and the 1,3-di-4-piperidyl propane in place of the piperidyl propane compound alone, was employed, all other materials and procedures being the same. The product was virtually indistinguishable from that reported above. Replacement of all of the 1,3-di-4-piperidyl propane with piperazine also provided excellent adhesion to the vinyl and excellent flexibility. Some adverse effect on gel formation and pot life is, however, noted with the specific thickener or gellant employed. Replacement of the Acrysol gellant or thickener with bentonite clay provided improved gel formation with no adverse effect on the final products.

From the foregoing description, it can be seen that preferably the epoxy resin component is, accordingly, a liquid epoxy resin consisting essentially of 85–100 percent of a liquid polyglycidyl ether of a polyhydric phenol having an epoxy equivalent weight of 160–300 and 0–15 percent by weight of a solid polyglycidyl ether of a polyhydric phenol having an epoxy equivalent weight of 400–1,000, the solid polyglycidyl ether being soluble in the liquid polyglycidyl ether. The curing agent component preferably consists essentially of 40–60 percent by weight of a polymeric fatty amido-amine having an amine number of 300–400, and 40–60 percent of a monomeric fatty amido-amine having an amine number of 425–450. The polymeric fatty amido-amine is the amidification reaction product of a polymeric fat acid and an excess of amine, the amine consisting essentially of (a) 25-75 amine equivalent percent of a diamine of the formula HN-Z-NH where Z is

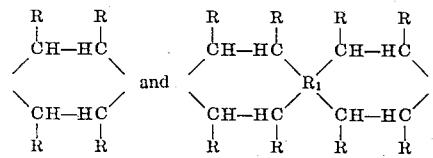

where R is hydrogen or an alkyl radical having 1–6 carbon atoms and $R_1$ is a divalent aliphatic hydrocarbon radical containing at least 1 carbon atom and (b) 25–75 amine equivalent percent of an aliphatic polyamine, such as the polyalkylene polyamines in which the alkylene group contains from 2–6 carbon atoms, which may be represented by the formula $H_2N(R'NH)H$ where R' is the aliphatic hydrocarbon radical and n is an integer from 1–6. The monomeric fatty amido-amine is the amidification reaction product of a monomeric fatty acid containing 8–24 carbon atoms and an excess of an aliphatic polyamine of the type noted above.

The epoxy component may also contain or have added thereto a reactive diluent, such as the conventional reactive diluents which are generally aliphatic or aromatic monoepoxides. Illustrative of such diluents are butyl glycidyl ether, allyl glycidyl ether, phenyl glycidyl ether or styrene oxide. When present, such diluents generally do not exceed 15 percent by weight of the epoxy resin. In addition, there may be added to either component, fillers, extenders, pigments, dyes, colorants, which would not affect the final properties of the cured adhesive composition.

The embodiments of the present invention in which an exclusive property or privilege is claimed are defined as follows:

1. An adhesive composition comprising an epoxy resin component and a curing agent component therefor, said epoxy resin component comprising
   a. 85–100 percent by weight of a liquid polyglycidyl ether of a polyhydric phenol having an epoxy equivalent weight of about 160–300 and
   b. 0–15 percent by weight of a solid polyglycidyl ether of a polyhydric phenol having an epoxy equivalent weight of about 400–1,000 said solid polyglycidyl ether being soluble in said liquid polyglycidyl ether so that said epoxy resin component is liquid at room temperature, said curing agent component comprising a mixture of 40–60 percent by weight of a polymeric fatty amido-amine having an amine number of about 300–400 and 40–60 percent by weight of a monomeric fatty amido-amine having an amine number of about 425–450, said polymeric fatty amido-amine comprising the amidification reaction product at temperatures of about 100°–300+ C. of a polymeric fat acid and an excess of amine comprising
   c. 25–75 amine equivalent percent of a diamine of the formula HN—Z—NH where Z is selected from the group consisting

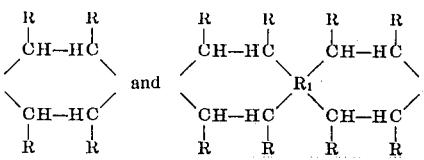

where R is hydrogen or an alkyl radical having from 1–6 carbon atoms and $R_1$ is a divalent aliphatic hydrocarbon radical containing at least 1 carbon atom and
   d. 25–75 amine equivalent percent of an aliphatic polyamine of the formula $H_2N(R'NH)_nH$ where R' is an aliphatic hydrocarbon radical and n is an integer from 1–6, and said monomeric fatty amido-amine comprising the amidification reaction product at temperatures of about 100°–300° C. of a monomeric fatty acid containing from 8–24 carbon atoms and an excess of a polyamine of the formula $H_2N(R'NH)H$ where R' and n are as defined above.

2. An aqueous emulsion in water of the adhesive composition defined in claim 1.

3. An aqueous emulsion as defined in claim 2 wherein the ratio by weight of water to said adhesive composition is about 1–3:1.

4. An aqueous emulsion as defined in claim 2 wherein said water contains a thickener in an amount of about 1–3 percent by weight based on the total weigh of water and adhesive composition.

5. An adhesive composition as defined in claim 1 wherein said epoxy resin component comprises about 40–70 percent by weight and said curing agent comprises 30–60 percent by weight based on the total weight of epoxy and curing agent components.

6. An adhesive composition as defined in claim 1 wherein diamine is selected from the group consisting of piperazine and 1,3-di-4-piperidyl propane.

7. An adhesive composition as defined in claim 1 wherein said epoxy resin component is a liquid polyglycidyl ether of 2,2-bis(p-hydroxyphenyl) propane.

8. An adhesive composition as defined in claim 1 wherein said polyamine is a polyalkylene polyamine in which said alkylene group contains 1–6 carbon atoms.

9. A adhesive composition as defined in claim 1 wherein said polymeric fat acid is polymerized tall oil fatty acids and said monomeric fatty acid is monomeric tall oil fatty acids.

10. An adhesive composition as defined in claim 1 wherein said polyhydric phenol is 2,2-bis(p-hydroxyphenyl) propane, said polymeric fat acid is polymerized tall oil fatty acids, said diamine is 1,3-di-4-piperidyl propane, said polyamine is tetraethylene pentamine and said monomeric fatty acid is monomeric tall oil fatty acids.

* * * * *

UNITED STATES PATENT OFFICE
CERTIFICATE OF CORRECTION

Patent No. 3,666,695  Dated May 30, 1972

Inventor(s) George A. Jachimowicz, Mark A. Minatelli and Harold M. Preston

It is certified that error appears in the above-identified patent and that said Letters Patent are hereby corrected as shown below:

Col. 2, in the formula, after the second benzene ring the formula should read --- 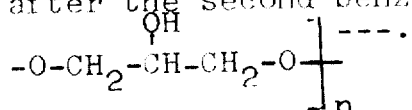 ---.

Col. 5, line 65, delete "by" and substitute therefor ---be---.
Col. 6, line 72, delete "hours" and substitute therefor ---hour---.
Col. 8, line 18, delete "agen" and substitute therefor ---agent---.
Col. 9, line 51, delete the formula and substitute therefor
        ---$H_2N(R'NH)_nH$---
Col.10, line 18, after "consisting" insert ---of---.
        line 46, delete "weigh" and substitute ---weight---.
        line 62, delete " A" and substitute ---An---.

Signed and sealed this 9th day of January 1973.

(SEAL)
Attest:

EDWARD M.FLETCHER,JR.  ROBERT GOTTSCHALK
Attesting Officer  Commissioner of Patents